United States Patent
Kallfass et al.

(10) Patent No.: US 11,572,273 B2
(45) Date of Patent: Feb. 7, 2023

(54) MODIFIED PHYLLOSILICATES FOR USE IN SOLID CHEMICAL OXYGEN GENERATING COMPOSITIONS, OXYGEN GENERATOR, AND METHOD OF GENERATING OXYGEN

(71) Applicant: DIEHL AVIATION GILCHING GMBH, Gilching (DE)

(72) Inventors: Christoph Kallfass, Schwaebisch Hall (DE); Arthur Hejczyk, Berlin (DE)

(73) Assignee: Diehl Aviation Gilching GmbH, Gilching (DE)

( * ) Notice: Subject to any disclaimer, the term of this patent is extended or adjusted under 35 U.S.C. 154(b) by 424 days.

(21) Appl. No.: 16/525,891

(22) Filed: Jul. 30, 2019

(65) Prior Publication Data
US 2020/0031666 A1   Jan. 30, 2020

(30) Foreign Application Priority Data
Jul. 30, 2018   (EP) .................... 18186436

(51) Int. Cl.
   *C01B 13/02*   (2006.01)
(52) U.S. Cl.
   CPC ...... *C01B 13/0218* (2013.01); *C01B 13/0296* (2013.01)
(58) Field of Classification Search
   None
   See application file for complete search history.

(56) References Cited

U.S. PATENT DOCUMENTS

| | | | |
|---|---|---|---|
| 4,101,291 A * | 7/1978 | Marion | B01J 7/00 252/186.24 |
| 4,981,655 A | 1/1991 | Kolbe et al. | |
| 9,878,909 B2 | 1/2018 | Kallfass | |
| 10,207,925 B2 | 2/2019 | Kallfass | |
| 2016/0060111 A1* | 3/2016 | Kallfass | B01J 7/00 423/579 |

FOREIGN PATENT DOCUMENTS

| | | |
|---|---|---|
| DE | 3725105 A1 | 2/1989 |
| EP | 2851340 A1 | 3/2015 |
| EP | 2990378 A1 | 3/2016 |
| WO | 2008094490 A1 | 8/2008 |

OTHER PUBLICATIONS

Kurian et al. ("A Review on the Importance of Pillared Interlayered Clays in Green Chemical Catalysts", IOSR J. Appl. Chem. (2016) pp. 47-54). (Year: 2016).*

* cited by examiner

*Primary Examiner* — Colin W. Slifka
*Assistant Examiner* — Michael Forrest
(74) *Attorney, Agent, or Firm* — Laurence A. Greenberg; Werner H. Stemer; Ralph E. Locher (57) ABSTRACT

A composition for generating oxygen includes at least one oxygen source selected from chlorates and perchlorates. An oxygen generating device includes such a composition. Oxygen is generated by decomposing such a composition. In the context, phyllosilicate compounds are used as multifunctional components in the oxygen generating compositions.

15 Claims, 4 Drawing Sheets

MODIFIED PHYLLOSILICATES FOR USE IN SOLID CHEMICAL OXYGEN GENERATING COMPOSITIONS, OXYGEN GENERATOR, AND METHOD OF GENERATING OXYGEN

CROSS-REFERENCE TO RELATED APPLICATION

This application claims the priority, under 35 U.S.C. § 119, of European patent application EP 18 186 436.4, filed Jul. 30, 2018; the prior application is herewith incorporated by reference in its entirety.

BACKGROUND OF THE INVENTION

Field of the Invention

The present invention relates to solid compositions for generating oxygen, comprising at least one oxygen source selected from alkali metal chlorates, alkali metal perchlorates, alkaline earth metal chlorates, alkaline earth metal perchlorates and mixtures thereof, to oxygen generating devices comprising such compositions, to methods for generating oxygen by combusting such compositions, and to the use of a modified phyllosilicate compound as a multifunctional component in such compositions.

Compositions for generating oxygen are required in restricted environments such as submarines or space capsules, or in emergency situations such as in the case of sudden pressure drops in aircraft.

Solid oxygen generating compositions have been known for a long time. Typically, the compositions produce oxygen by thermal decomposition of alkali metal chlorates or perchlorates or alkaline earth metal chlorates or perchlorates. Accessory combustible materials such as carbon or metal powders (serving as fuels, i. e. reducing agents) may be added in order to assist in obtaining the high temperatures required for the decomposition of the chlorates and/or perchlorates. Since the chlorates and/or perchlorates (halogenates (+V, +VII)), in the form of candles, slowly "burn" in the presence of reducing agents, and liberate their oxygen, the compositions are also called "oxygen candles" or "chlorate candles."

In addition to these oxygen delivering compounds one or more additives with different qualities are used: a catalyst (e.g. transition metal oxides such as MnO, $Mn_2O_3$, $Fe_2O_3$, etc), a binder for stabilization of the mold and a "reaction heat moderator" (e.g. a silicate such as phlogopite), a chemical moderator during the decomposition process to avoid unwanted side reactions such as the evolution of chlorine (e.g. $BaO_2$). Modified preparations are used in solid chemical oxygen generating compositions with the objective of generating an enduring and continuous oxygen flow without any traces of chlorine at low reaction temperature.

The compositions for generating oxygen are molten and cast into a desired shape or, usually, press-molded into powder compacts such as cylindrical rods, tablets, briquettes or other shapes. The shaped composition is placed into a container, and combined with a primer to yield an oxygen generator, which ideally can be easily handled and stored for a quite long time without suffering deterioration.

Once the primer (ignitor) is activated, for example mechanically or electrically, the released energy starts the halogenate decomposition reaction which proceeds without supply of auxiliary power.

Prior to and during the reaction progress, the oxygen generating composition should be in a mechanically stable form in order to avoid any failure during activation (ignition) of the composition, and to avoid interruption of the oxygen flow, which might result from mechanical alterations of the composition structure induced by environmental effects, or by changes in the reaction progress.

Many conventional oxygen generating compositions have the problem that the reaction zone in the burning candle is liquid, due to the high decompositon temperature. Irrespective of the geometrical shape of an oxygen candle, there is always a reaction zone traveling through the candle, starting at the point of ignition. The oxygen generating composition, of course, does not necessarily have the form of a candle, and in the following, the term "candle" means any mold, i.e. shaped part, for example a briquette or tablet.

Depending on the ingredients of a particular oxygen candle, which influence decomposition temperature and melting temperature of the candle, the candle may melt not only in the reaction zone, but also at some distance from the reaction zone. Thus, there is a liquid zone traveling through the candle upon decomposition.

It can be easily understood, that such liquid zone within the otherwise solid candle considerably destabilizes the candle. Mechanical shocks and even slight vibrations tend to separate the unburned portion of a candle from the burned portion, thus interrupting heat transfer, and stopping the decomposition and generation of oxygen.

Various attempts have been made to impart greater structural integrity to the burning candles and their reaction residues in order to render them less sensitive to mechanical influences, and to render them suitable also for operation under zero gravity conditions.

U.S. Pat. No. 9,878,909 B2 and its counterpart European patent application EP 2 851 340 A1 solve the problem of candle destabilization by providing a composition for generating oxygen, the composition comprising at least one oxygen source selected from alkali metal chlorates, alkali metal perchlorates, alkaline earth metal chlorates, alkaline earth metal perchlorates and mixtures thereof, wherein the composition further comprises at least one compound selected from transition metal ortho-phosphates, transition metal ortho-vanadates and mixtures thereof, and wherein the at least one ortho-phosphate, ortho-vanadate or ortho-phosphate-vanadate contains at least one alkali metal and/or at least one alkaline earth metal. The ortho-phosphate compounds and the ortho-vanadate compounds are multifunctional components because they both act as binders and facilitate decomposition of the oxygen source. Melting or localized melting of the composition during decomposition is avoided by adding the transition metal ortho-phosphate compound, or the transition metal ortho-vanadate compound, or a mixture thereof.

U.S. Pat. No. 10,207,925 B2 and its counterpart European patent application EP 2 990 378 A1 solve the problem of candle destabilization by providing a composition for generating oxygen, the composition comprising at least one oxygen source selected from alkali metal chlorates, alkali metal perchlorates, alkaline earth metal chlorates, alkaline earth metal perchlorates and mixtures thereof, wherein the composition further comprises at least one zeolite compound, the zeolite compound having a framework comprising open channels. The zeolite compound is a multifunctional component because it both acts as a binder and facilitates decomposition of the oxygen source. Furthermore, the zeolite compound may act as fuel and/or take up reaction heat generated in the oxygen source decomposition process. Melting or localized melting of the compositions during decomposition is avoided by adding the multifunctional zeolite compound.

The compositions for generating oxygen disclosed in the above-noted patents (U.S. Pat. No. 9,878,909 B2/EP 2 851 340 A1 and U.S. Pat. No. 10,207,925 B2/EP 2 990 378 A1 provide satisfactory solutions to the problems in the field of oxygen generating compositions, such as producing an oxygen stream reliably and continuously over an extended period of time; producing an oxygen stream which is breathable by humans, i.e. essentially free from toxic or otherwise noxious components such as carbon monoxide, carbon dioxide, and chlorine, providing the oxygen stream at a low temperature; and avoiding destabilization of the oxygen candle during decomposition.

However, it would be beneficial to provide a further solution to the problems indicated above. In particular, it would be beneficial to provide a composition for generating oxygen capable of producing an oxygen stream reliably and continuously over an extended period of time.

SUMMARY OF THE INVENTION

It is accordingly an object of the invention to provide an oxygen-generating composition which overcomes the above-mentioned and other disadvantages of the heretofore-known devices and methods of this general type.

It is a further beneficial object to provide a composition for generating oxygen capable of producing an oxygen stream breathable by humans, i.e. essentially free from toxic or otherwise noxious components such as carbon monoxide, carbon dioxide, and chlorine.

It would also be beneficial to provide a composition for generating oxygen capable of producing an oxygen stream at a low temperature, for example as close to room temperature as possible.

Furthermore, it would be beneficial to provide a composition for generating oxygen which substantially maintains its size and shape during the reaction progress in order to avoid any failure during activation of the composition, and to avoid interruption of the oxygen flow which might result from mechanical alterations of the composition structure.

With the foregoing and other objects in view there is provided, in accordance with the invention, a composition for generating oxygen, the composition comprising:

at least one oxygen source selected from the group consisting of alkali metal chlorates, alkali metal perchlorates, alkaline earth metal chlorates, alkaline earth metal perchlorates, and mixtures thereof; and at least one phyllosilicate compound having at least one transition metal ion intercalated between phyllosilicate sheets.

Exemplary embodiments of the invention include a composition for generating oxygen, comprising at least one oxygen source selected from alkali metal chlorates, alkali metal perchlorates, alkaline earth metal chlorates, alkaline earth metal perchlorates and mixtures thereof, wherein the composition further comprises at least one phyllosilicate compound, the phyllosilicate compound having at least one transition metal ion intercalated between phyllosilicate sheets.

Further exemplary embodiments of the invention include an oxygen generating device comprising the inventive composition for generating oxygen by a self-sustaining decomposition, a container for containing the oxygen generating composition and a primer for starting decomposition of the composition for generating oxygen.

Further exemplary embodiments of the invention include the use of a phyllosilicate compound having at least one transition metal ion intercalated between phyllosilicate sheets, as a multifunctional component in a composition for generating oxygen, the composition comprising at least oxygen source selected from alkali metal chlorates, alkali metal perchlorates, alkaline earth metal chlorates, alkaline earth metal perchlorates and mixtures thereof, wherein the multifunctional component is multifunctional in that it both acts as a binder and as a catalyst catalyzing the decomposition of the oxygen source.

Further exemplary embodiments of the invention include a method for generating oxygen by decomposing a composition comprising at least one oxygen source selected from alkali metal chlorates, alkali metal perchlorates, alkaline earth metal chlorates, alkaline earth metal perchlorates and mixtures thereof, wherein melting or localized melting of the composition during decomposition is avoided by including at least one phyllosilicate compound having at least one transition metal ion intercalated between phyllosilicate sheets, into the composition.

Technical implementations of the inventive concept as claimed herein include a composition for generating oxygen, a method for generating oxygen, an oxygen generating device, and the use of a phyllosilicate compound as a multifunctional component in the composition for generating oxygen.

As can be easily understood, the constituents of the composition for generating oxygen are the same, irrespective of which technical implementation of the invention is contemplated. Therefore, any disclosure provided for a particular implementation, such as composition, method, use or device is analogously applicable to the other implementations of this invention.

A composition for generating oxygen, an oxygen generating device, and a method for generating oxygen in the sense of this invention is a composition, device, or method intended for generating oxygen, while any composition, device or method yielding oxygen as a side reaction does not constitute a composition, device or method in the sense of this invention.

In exemplary embodiments, the oxygen generating device of the invention is an apparatus comprising the composition for generating oxygen of the invention as well as other means and devices essential or advantageous for proper functioning, and conventional per se, for example a containment, an igniting device, means for heat insulation, filter layers for retaining particulates, etc. Reference is made to German published patent applications DE 30 39 442 A1 and DE 37 25 105 A1 (corresponding to U.S. Pat. No. 4,981,655) showing exemplary oxygen generators.

In exemplary embodiments the composition for generating oxygen of the present invention is provided in the form of powder compacts, such as press-molded rods, pellets, sheets, tablets and briquettes, however, the morphological shape and structure is not limited in any particular manner. For example, the composition may be formed into tablets having different oxygen production capacities achieved by zones of different reaction velocities as described in DE 37 25 105 A1 and U.S. Pat. No. 4,981,655. Further, as described in those documents, the tablets may be contained in the oxygen generator container in bulk form, and intimate contact between tablets may be maintained, for example, by a tension member such as a pressure spring.

In exemplary embodiments, the composition for generating oxygen, on the one hand, contains components conventional in such compositions, namely oxygen sources, and optionally fuels, and various auxiliary agents. Oxygen sources are halogenates, i. e. chlorates, perchlorates, and mixtures of chlorates and perchlorates of alkali metals or alkaline earth metals or mixtures thereof.

In exemplary embodiments, the oxygen sources are chlorates and/or perchlorates of lithium, sodium, potassium, and mixtures thereof, in particular chlorate and perchlorate of sodium.

In exemplary embodiments, various metals in powder form are used as fuels. The fuels act as reducing agents, and are oxidized to metal oxides, thus providing additional energy for supporting the decomposition. Exemplary fuels are fine powders of aluminum, iron, magnesium, manganese, silicon, and titanium, and non-metals such as boron and carbon may also be used.

Among auxiliary agents included, in exemplary embodiments, in the composition for generating oxygen, barium peroxide, and the oxide, peroxide and hydroxide of alkali metals shall be specifically mentioned. These compounds serve for binding chlorine and carbon dioxide, which are sometimes produced in trace amounts, but should not be present in breathable oxygen.

For an overview over exemplary compositions, reactions and problems associated with oxygen generators, reference is made to M. M. MARKOWITZ, D. BORYTA, H. STEWART: *Lithium Perchlorate Oxygen Candle*, I and EC Product Research and Development, Vol. 3, No. 4, December 1964, 321-330 and W. H. SCHECHTER, R. R. MILLER, R. M. BOVARD, C. B. JACKSON, J. R. PAPPENHEIMER, *Chlorate Candles as a Source of Oxygen*, Ind. Eng. Chem. 42, 2348 (1950).

On the other hand, the composition for generating oxygen contains components, known per se, but not heretofore used in compositions for generating oxygen. Namely, in exemplary embodiments, the composition of the present invention contains a phyllosilicate compound or a mixture of phyllosilicate compounds which have been modified by introducing transition metal ions between the phyllosilicate sheets. These modified phyllosilicate compounds replace, at least in part, conventional binders and catalysts, and they may also take up reaction heat. Therefore, the modified phyllosilicate compounds are multifunctional in that they serve as binders, as catalysts catalyzing the decomposition of the oxygen source, and as reaction heat moderators. In one embodiment, the compositions do not contain any binder and/or catalyst in addition to the multifunctional phyllosilicate components. In another embodiment, conventional binders, such as unmodified phyllosilicate compounds, and/or conventional catalysts such as oxides or iron, cobalt or manganese, are present in addition to the multifunctional components.

Phyllosilicates are silicates wherein the anions form parallel sheets consisting of corner-linked $SiO_4$ tetrahedra. Between adjacent sheets cations and/or water molecules may be intercalated. Phyllosilicates constitute a large family of compounds having many structural features in common. As a consequence, the members of the phyllosilicate family behave similarly.

Specifically mentioned shall be members of the biotite mixed crystal series, e.g. phlogopite, muscovite, and hydromuscovite. The three layer silicate phlogopite constitutes the end member of the biotite mixed crystal series, which is iron free or poor in iron. Phlogopite has the ideal chemical formula $KMg_3[(F,OH)_2/AlSi_3O_{10}]$, muscovite has the ideal chemical formula $KAl_2[(OH,F)_2/AlSi_3O_{10}]$, and hydromuscovite has the ideal chemical formula $(K, H_3O)Al_2[(OH)_2/AlSi_3O_{10}]$. The minerals may contain further elements such as titanium, iron (II, III), manganese, magnesium, calcium and sodium. Hydrobiotite, for example, contains magnesium, iron and manganese, resulting in the chemical formula $(K,H_3O)(Mg, Fe^{3+},Mn)_3[(OH)_2/AlSi_3O_{10}]$.

In the phyllosilicates, some of the elements naturally contained therein can be extracted and replaced by different elements. Thus, elements which are not contained in the naturally occurring minerals can be introduced, or the naturally occurring minerals can be enriched in specific elements. This phenomenon is used in the present invention for modifying phyllosilicates by intercalating transition metal ions, rendering the phyllosilicates versatile constituents of chlorate candles.

Intercalating transition metal ions which are capable to catalyze the decomposition of alkali metal chlorates, alkali metal perchlorates, alkaline earth metal chlorates, and alkaline earth perchlorates, renders the phyllosilicate compound multifunctional.

Transition metals as understood herein are those elements which have an incomplete d-shell, or which may form ions having an incomplete d-shell, including lanthanides and actinides.

In exemplary embodiments, the transition metal ion intercalated between the phyllosilicate sheets is selected from the group consisting of ions of iron, manganese, cobalt, zirconium, zinc, copper and titanium. In an exemplary embodiment, cations of iron and/or manganese are intercalated between the phyllosilicate sheets.

The modified phyllosilicate can be obtained from the respective pristine phyllosilicate, for example from pristine phlogopite, by educing the phyllosilicate using boiling hydrochloric acid in a closed vessel. The intermediate is a white powder, having the same crystallographic properties as the respective pristine phyllosilicate. In a second step a solution of a salt of the transition metal which shall be introduced between the phyllosilicate sheets (for example iron chloride or manganese chloride) is heated together with the intermediate phyllosilicate for a certain time in a closed vessel. It is observed that the crystallographic properties of the modified phyllosilicate are identical to the crystallographic properties of the pristine phyllosilicate. Actually, the crystallographic properties do not change during the whole modification process.

An exemplary preparation process is described below using phlogopite as a starting compound. The process is analogously applicable to other phyllosilicates.

Many phyllosilicates, in the form they are found in nature, contain a certain amount of transition metals. In conventional chlorate candles, phyllosilicates have been used as binders, however, these phyllosilicates did not contain transition metals. The reason is that phyllosilicates have been used, and are still used, for industrial recovery of valuable metals therefrom, e.g. lithium. The valuable metals are extracted from the phyllosilicates in the same or a similar manner as in the first step of the method for obtaining modified phyllosilicates according to this invention, leaving back phyllosilicates which are essentially free from transition metals. This phyllosilicate waste material is readily available at a very low price and, therefore, is attractive as a binder material in chlorate candles.

The waste material is not catalytically active. It has been used, and is still used, in combination with metal oxide catalysts. It is not multifunctional and does not provide the advantages achieved with the modified phyllosilicates used in the present invention.

The multifunctional modified phyllosilicate compounds used according to the present invention provide distinct advantages when incorporated into oxygen generating compositions. The use of the modified phyllosilicate having the properties of a binder, a reaction heat moderator and a catalyst, unified in one single component, simplifies the production process of the oxygen candles. Instead of two different components, a binder and a catalyst, only one component is needed. This makes the mixing process faster and saves weight (approximately one weight percent) which can be used for additional oxygen delivering chemicals. Furthermore, the modified phyllosilicates are environmentally friendly components which do not produce any disposal problems after use of the compositions for generating oxygen.

Oxygen candles, or other shaped parts, comprising the multifunctional modified phyllosilicate compounds substantially maintain their sizes and shapes during use, although they release considerable amounts of their chemically bound oxygen, due to oxygen liberation in gaseous form. Therefore, in oxygen candles according to the present invention, the structure remains substantially intact. This structural stability also reduces contact problems in oxygen generating devices using a series of candles (tablets, pellets), or candles (tablets, pellets) in bulk form. Once the reaction zone has completely traveled through a candle within a plurality of candles, the heat of reaction evolved by the first candle can be used for activating, i.e. igniting, a neighboring candle or neighboring candles. Consequently, the reaction reliability jumps from one candle across an adjacent one, thus also contributing to continuous and enduring oxygen evolution.

Compositions for generating oxygen comprising the modified phyllosilicate compounds which are multifunctional in that they act both as a binder and as a catalyst, but lacking any additional catalyst or binder, show a similar oxygen production behavior as compositions for generating oxygen comprising the same constituents with the exception that the multifunctional component is replaced by a conventional catalyst and a conventional binder.

Other features which are considered as characteristic for the invention are set forth in the appended claims.

Although the invention is illustrated and described herein as embodied in modified phyllosilicates for use in solid chemical oxygen generating compositions, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
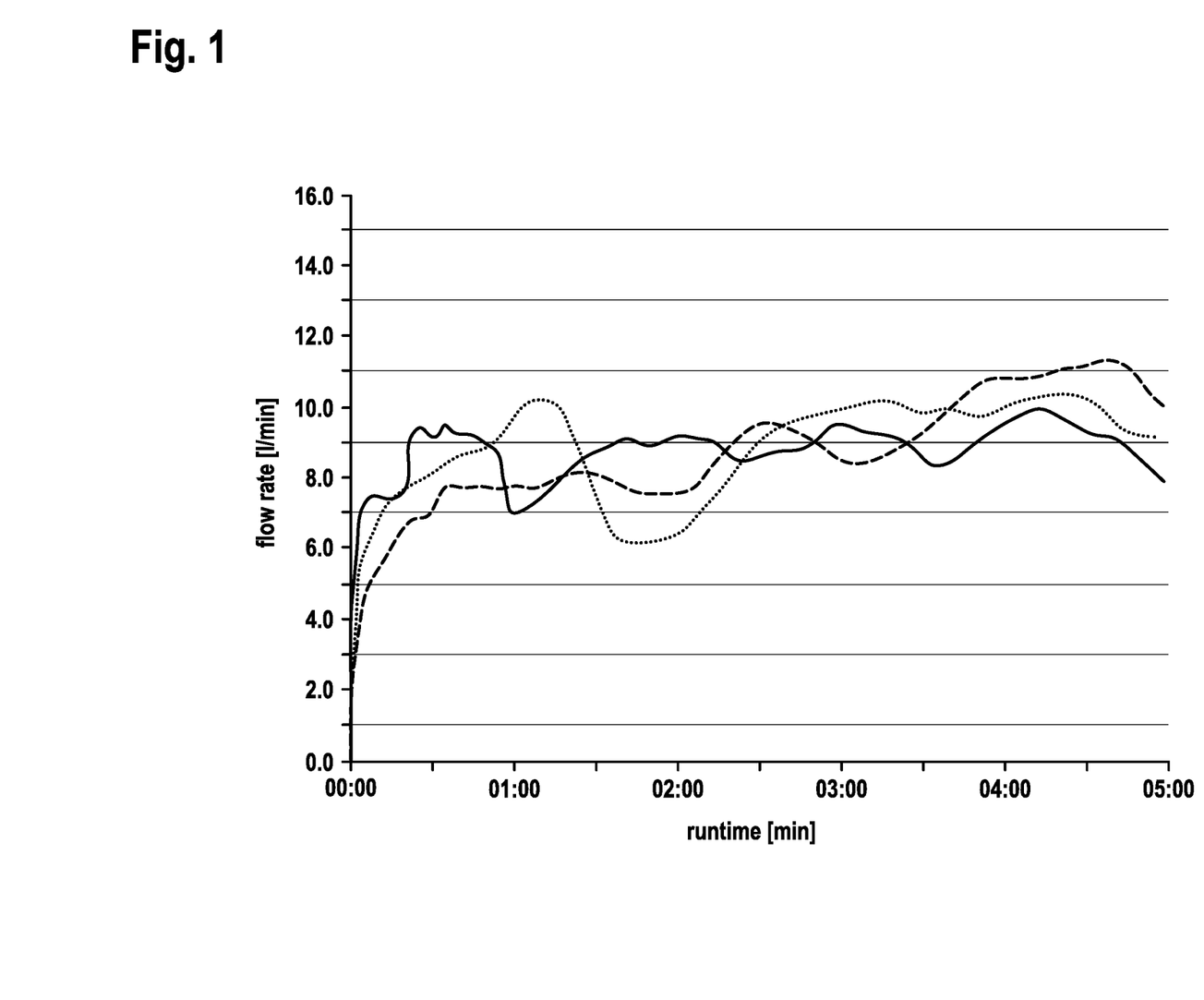
FIG. 1 to FIG. 3 are graphs comparing oxygen release of compositions for generating oxygen according to the present invention and oxygen release from a composition comprising separately provided catalyst and binder instead of a multifunctional phyllosilicate.
Figure 2:
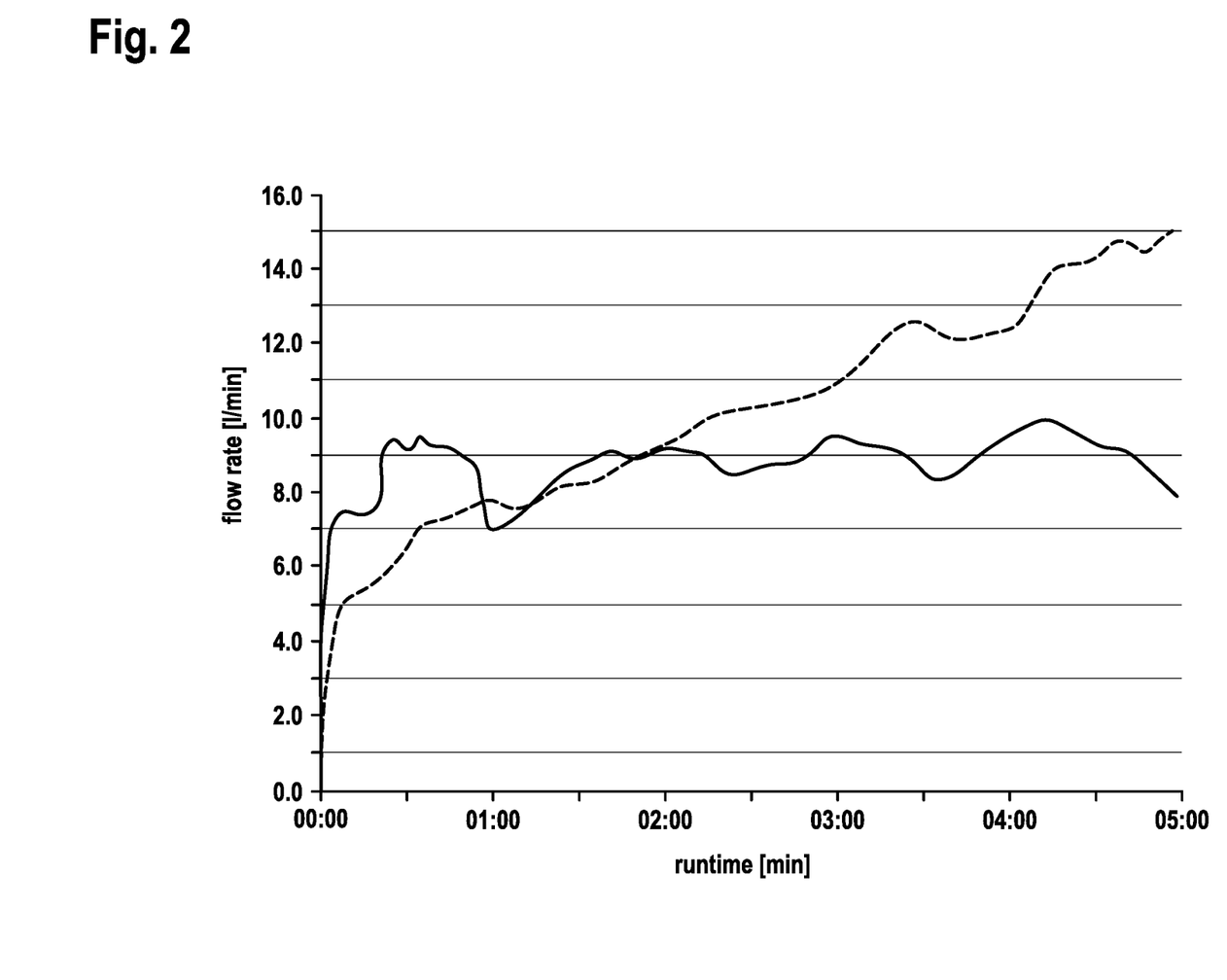
Figure 3:
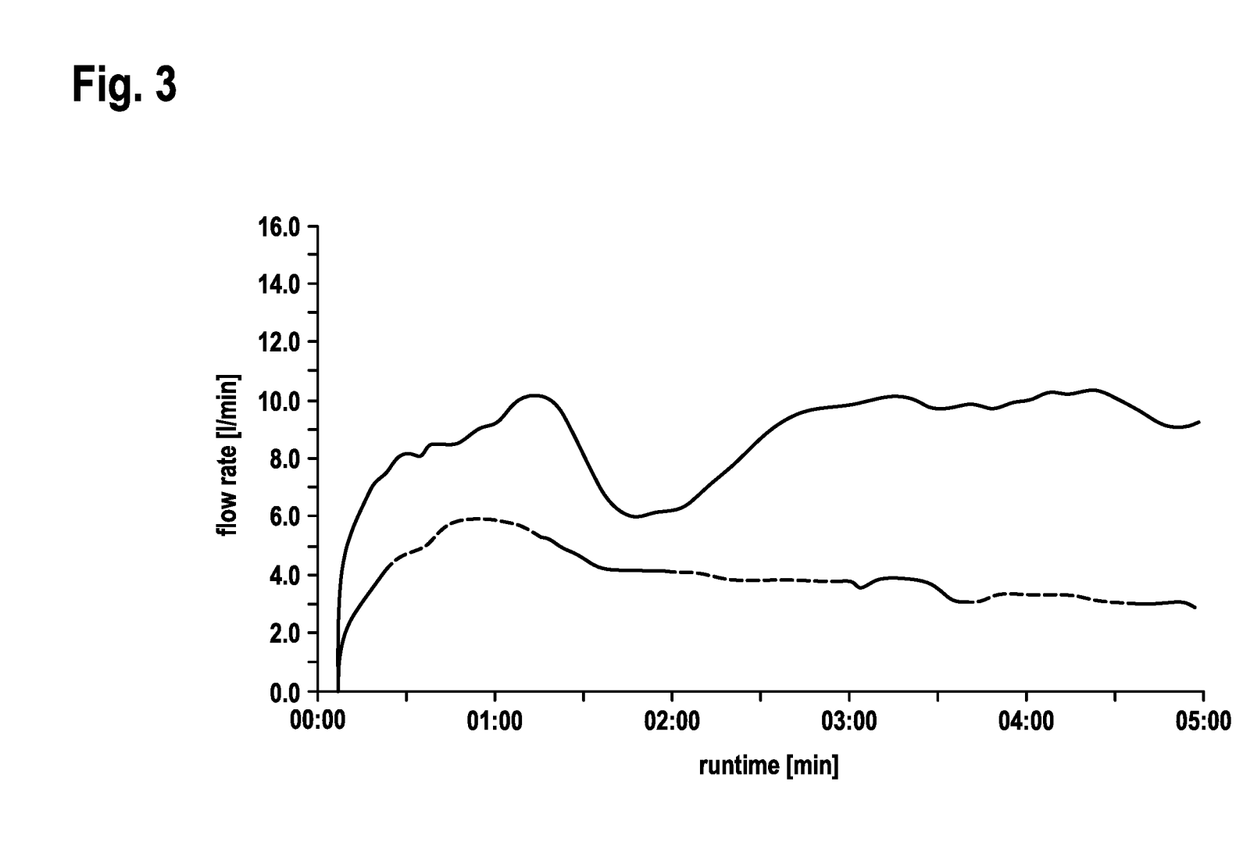

Referring now to the figures of the drawing in detail and first, particularly, to FIGS. 1-3 thereof, the graphs compare the oxygen release of compositions for generating oxygen according to the present invention and oxygen release from a composition comprising separately provided catalyst and binder instead of a multifunctional phyllosilicate.

The graphs of FIGS. 1-3 illustrate oxygen release. The oxygen flow rate is plotted against runtime. The runtime is the time which starts running at the time point of ignition of the composition. The oxygen flow rates are measured with a drum gas meter.

Example 1: Preparation of Phlogopite Enriched in Iron or Manganese

Phyllosilicates enriched in transition metals are prepared in two steps:

Leaching out/extraction of the phyllosilicate (in the present example: phlogopite).

Intercalation of desired transition metal ion(s) (in the present example iron (III) and manganese (II)) into the extracted material.

In the first step, the reaction mixture consisting of phyllosilicate and hydrochloric acid (see table 1) is charged into a fused silica flask equipped with a reflux condenser and a stirrer or, alternatively, into an autoclave having a teflon lining, and is then heated or stirred at room temperature, respectively, for a particular time. Different reaction times were tested for each extraction temperature (see table 2).

TABLE 1 chemicals used for extraction

| | phlogopite (starting product) | hydrochloric acid (concentrated) |
|---|---|---|
| amount used | 0.5 g | 50 cm$^3$ |
| grain size | <600 micrometer; tabular | — |
| color | yellowish-brownish, glossy | colorless |

TABLE 2 reaction vessels, temperatures and times for extraction (optimum times are underlined):

| | fused silica vessel | | | |
|---|---|---|---|---|
| vessel | room | boiling hydrochloric acid | autoclave | |
| temperature | temperature | (~110° C.) | 100° C. | 200° C. |
| time (optimum underlined) | 1, 7, <u>14</u> days | 2, 4, 8, <u>16</u> hours | 2, 4, <u>8</u>, 16 hours | 1, <u>2</u>, 7 hours |
| Extraction of Mg (in %)[1] | ≥94% | ≥98% | ≥97% | ≥99% |

[1]The Mg-content of the completely dissolved, not-extracted or intercalated phlogopite sample (reference sample), measured by wet chemical ICP-OES-analysis (inductively coupled plasma—optical emission spectroscopy), was set to 100%. The extracted samples (different extraction times) were also dissolved, analyzed by ICP-OES-analysis, and compared to the reference sample.

1): The Mg-content of the completely dissolved, not-extracted or intercalated phlogopite sample (reference sample), measured by wet chemical ICP-OES-analysis (inductively coupled plasma—optical emission spectroscopy), was set to 100%. The extracted samples (different extraction times) were also dissolved, analyzed by ICP-OES-analysis, and compared to the reference sample.

After completion of the extraction process, the intermediate product is filtered, washed several times with distilled water in order to wash away residual acid, and dried over night at 100° C. in a compartment dryer. Depending on the reaction conditions, the yellowish-brownish starting product has changed into a colorless whitish-shining intermediate product. A marked yellowish-brownish tint of the intermediate product can be seen if the reaction time has been too short. The grain sizes of the intermediate products were not changed by the selected reaction conditions.

In the second step, the intermediate product is heated together with different aqueous chloride solutions containing transition metal ions for different time periods (table 3). Then, the product is filtered, washed and dried, as described above for the intermediate product. The dry product is used in preparations for the chlorate candles.

TABLE 3 chemicals used for intercalation of iron and manganese, respectively, into the intermediate product. Optimum concentrations, reaction temperature and reaction time are underlined.

| | chemical used | |
|---|---|---|
| | iron(III)chloride | manganese(II)chloride |
| concentration | 0.001-0.3 mol | (0.01; 0.1) |
| volume of water (solvent) | 50 cm$^3$ | |
| amount of intermediate | 0.2 g | |
| reaction vessel | autoclave with teflon lining | |
| reaction time | 6, 12, 24 hours | |
| reaction temperature | 100-200° C. | |

Example 2: Test of the Products Obtained in Example 1 in Chlorate Candles

The tested chlorate candles according to the invention had a composition consisting of sodium chlorate and modified phlogopite. No additional catalyst, binder or fuel was contained therein. For comparison, chlorate candles consisting of sodium chlorate and separately provided catalyst and binder, lacking modified phlogopite, were also tested.

Each tested chlorate candle had a weight of about 140 g (about ⅓ of the weight and size of chlorate candles used in aircrafts, which produce oxygen for about 15 minutes).

FIG. 1 compares the oxygen flow rates produced by chlorate candles (1) comprising phlogopite modified with manganese ions (without additional catalyst and binder), (2) comprising phlogopite modified with iron ions (without additional catalyst and binder), and (3) comprising $Fe_2O_3$ as a catalyst and natural phlogopite as a binder, while lacking modified phlogopite.

In FIG. 1, the solid line represents the oxygen flow rate obtained with the preparation according to the state of the art, i.e. the preparation comprising sodium chlorate, $Fe_2O_3$ as a catalyst (1% by weight of the total weight of the chlorate candle) and naturally occurring phlogopite as a binder (2% by weight of the total weight of the chlorate candle).

The dotted line represents the oxygen flow rate obtained with the chlorate candle comprising sodium chlorate and phlogopite having manganese intercalated therein (intercalation: 0.01 mol aqueous manganese chloride solution; reaction conditions: 12 hours at 200° C. in an autoclave). ICP-OES analysis revealed that the Mn concentration was consistent with Mn(II)ions occupying ≥98%, i.e. nearly 100% of the sites becoming vacancies due to the extraction of magnesium.

The dashed line represents the oxygen flow rate obtained with the chlorate candle comprising sodium chlorate and phlogopite having iron intercalated therein (intercalation: 0.01 mol aqueous iron chloride solution; reaction conditions: 12 hours at 200° C. in an autoclave). ICP-OES analysis revealed that the Fe-concentration was consistent with Fe(III)ions occupying ≥98%, i.e. nearly 100% of the sites becoming vacancies due to the extraction of magnesium.

FIG. 1 illustrates that the oxygen production proceeds similar in all three cases, i.e. the oxygen candles according to the present invention, which lack both a separately provided binder and a separately provided catalyst, produce oxygen flow rates comparable to the conventional chlorate candles.

FIG. 2 and FIG. 3 illustrate that the concentration of the transition metal within the phyllosilicate, and as a consequence the oxygen flow rate, can be influenced by appropriately selecting the intercalation conditions.

In FIG. 2, the solid line represents the oxygen flow rate obtained with the conventional chlorate candle (separately provided $Fe_2O_3$ and natural phlogopite, see above), and the dashed line represents the oxygen flow rate obtained with the chlorate candle comprising sodium chlorate and phlogopite having iron intercalated therein (0.1 mol; 12 hours at 200° C. in an autoclave). It can be seen that the phyllosilicate having a higher iron ion concentration produces oxygen with a flow rate which continuously increases with increasing run time. ICP-OES analysis revealed that the Fe-concentration was consistent with theoretical 120% of magnesium ions of natural phlogopite being replaced by Fe(III)ions. Upon microscopic inspection a blackish-brown precipitate can be seen on the surface of the phlogopite platelets. The precipitate has the form of non-coherent spots and consists of iron oxides.

In FIG. 3, the solid line represents the oxygen flow rate obtained with the conventional chlorate candle (comprising $Fe_2O_3$ as a catalyst and natural phlogopite as a binder, see above), and the dash-dotted line represents the oxygen flow rate obtained with the chlorate candle comprising sodium chlorate and phlogopite having manganese intercalated therein (0.01 mol; 12 hours at 100° C. in an autoclave). It can be seen that the low transition metal ion concentration has the effect that the oxygen flow rate decreases continuously with increasing runtime. ICP-OES analysis revealed that the Mn-concentration was consistent with ≥75% and ≤80% of the magnesium ions being replaced with Mn(II)ions, i.e. some of the vacancies created by extracting magnesium from phlogopite remain unoccupied.

The experiments show that intercalating an amount of transition metal ions into the phyllosilicate structure, which exceeds the number of vacancies in the phyllosilicate (created by extraction of an element originally contained therein) has the effect that the oxygen flow rate increases with increasing runtime. Unoccupied sites, on the other hand (a result of intercalating less transition metal ions than elements extracted from the phyllosilicate), have the effect that the oxygen flow rate decreases with increasing runtime.

Thus, in an exemplary embodiment wherein an increasing oxygen flow rate is desired, a transition metal amount corresponding to ≥110%, or ≥120% of the number of the vacancies created by extraction of an exchangeable element from a phyllosilicate, is introduced into the phyllosilicate.

In another exemplary embodiment wherein a decreasing oxygen flow rate is desired, a transition metal amount corresponding to ≤90%, or ≤80% of the number of vacancies created by extraction of an exchangeable element from a phyllosilicate is introduced into the phyllosilicate.

In a further exemplary embodiment, wherein a substantially constant oxygen flow rate is desired, a transition metal amount corresponding to between 90% and 110% of the number of vacancies created by extraction of an exchangeable element from a phyllosilicate, is introduced into the phyllosilicate.

Figure 4:
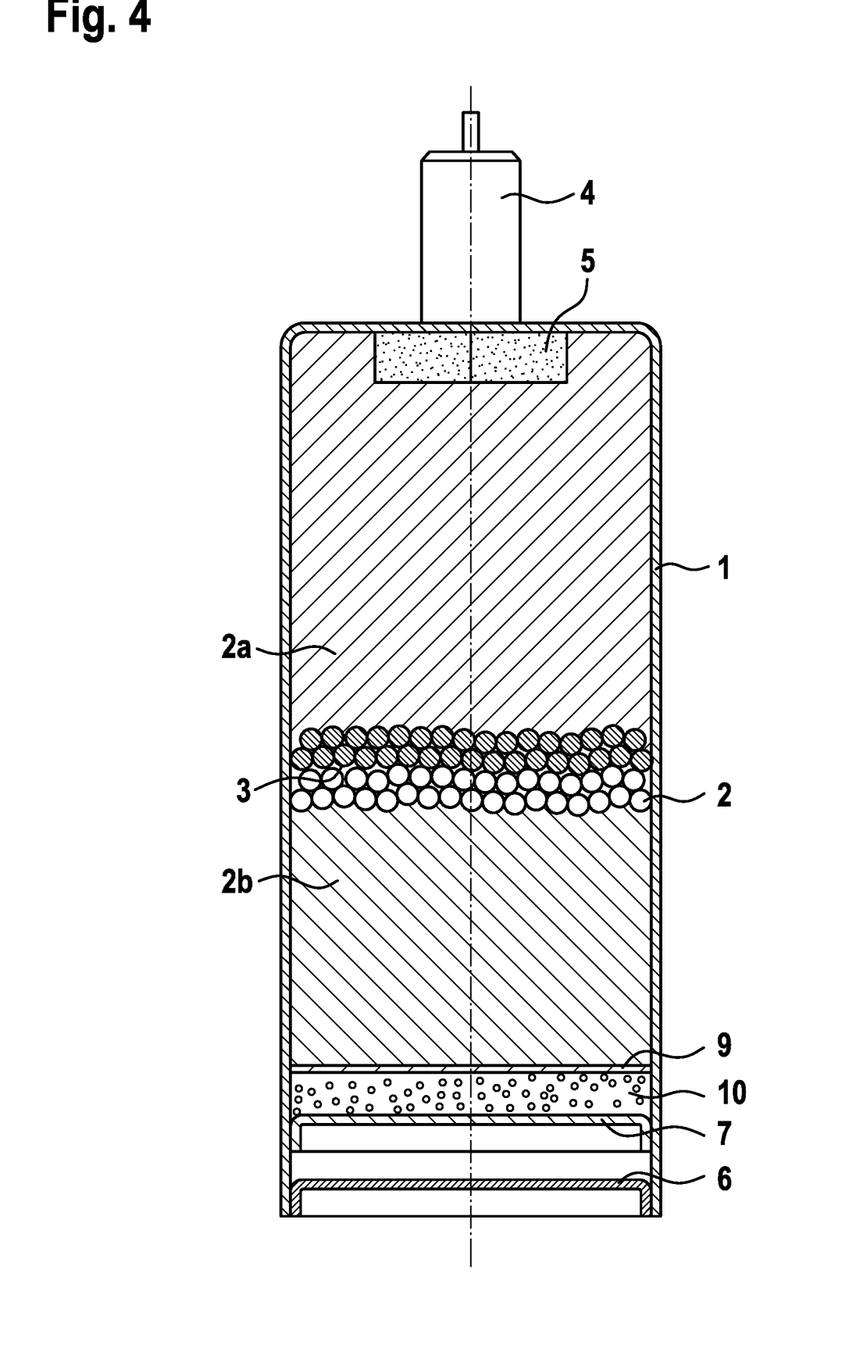
FIG. 4 is a schematic illustration of an oxygen generating device.

FIG. 4 is a sectional view of an exemplary oxygen generating device according to the present invention. The device is similar to the device illustrated in U.S. Pat. No. 4,981,655 and German publication DE 37 25 105. The oxygen generating device shown in FIG. 2 includes a cartridge 1 which is filled with a charge 2a, 2b of chlorate pellets 2 for releasing oxygen. At a first one of its ends, the cartridge 1 has an ignition device 4 and a starter charge 5. At the second end lying opposite the ignition device 4, the cartridge 1 is provided with an outlet base 6 from which the oxygen is released during operation and can be conducted to a consumer (not shown). A permeable base shell 7 is disposed ahead of the outlet base 6 and is attached to the inner wall surface of the cartridge. The intermediate space between the base shell 7 and a charge base 9 is filled with a dust filter 10.

The chlorate pellets 2 are ignited with the aid of the ignition device 4 and the starter charge 5 to operate the oxygen generator with the pellets 2 releasing oxygen while developing heat. The reacting pellets 2 thereby form an advancing reaction front 3 along the charge which leaves a reacted portion 2a of the charge behind and advance into the portion 2b of the charge which has not yet reacted. Oxygen is released during this process and passes through the permeable charge base 9, the dust filter 10 and the permeable base shell 7 to the outlet base 6 from which it can be conducted to a consumer. The dust particles released during the development of oxygen are held by the dust filter 10. Any means for maintaining intimate contact between the pellets, such as a pressure spring, is not required because the pellets substantially maintain their shapes during the decomposition process.

The compositions and devices of this invention are suitable for any usage where pure oxygen is needed, e.g. in medicine, SAR (search and rescue) activities, in aerospace, mining and submarine applications, and also in industrial applications such as welding.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A composition for generating oxygen in an oxygen candle, the composition being configured to maintain a size and a shape during a reaction process, the composition comprising:
   at least one oxygen source selected from the group consisting of alkali metal chlorates, alkali metal perchlorates, alkaline earth metal chlorates, alkaline earth metal perchlorates, and mixtures thereof; and
   at least one phyllosilicate compound having at least one transition metal ion intercalated between phyllosilicate sheets, the phyllosilicate compound being formed by extracting magnesium therefrom and replacing the magnesium with the transition metal ion at least at 98% of the sites becoming vacancies due to the extraction of the magnesium.

2. The composition according to claim 1, wherein the at least one transition metal ion is selected from the group consisting of iron, manganese, cobalt, zirconium, zinc, copper and titanium ions, and mixtures thereof.

3. The composition according to claim 1, wherein the at least one transition metal ion is iron and/or manganese.

4. The composition according to claim 1, wherein said at least one phyllosilicate compound is a member of the biotite mixed crystal series.

5. The composition according to claim 4, wherein said at least one phyllosilicate compound is phlogopite.

6. An oxygen generating device, comprising:
   a composition according to claim 1 for generating oxygen by a self-sustaining decomposition;
   a container housing said composition; and
   a primer for starting the decomposition of the composition for generating oxygen in said container.

7. The oxygen generating device according to claim 6, wherein the composition is in the form of one or more shaped parts.

8. A method of generating oxygen in an oxygen candle, the method comprising:
   providing a phyllosilicate compound having at least one transition metal ion intercalated between phyllosilicate sheets, the phyllosilicate compound being formed by extracting magnesium therefrom and replacing the magnesium with the transition metal ion at at least 98% of sites becoming vacancies due to the extraction of the magnesium, the phyllosilicate compound forming a multifunctional component in a composition for generating oxygen, the composition including at least one oxygen source selected from the group consisting of alkali metal chlorates, alkali metal perchlorates, alkaline earth metal chlorates, alkaline earth metal perchlorates, and mixtures thereof; and
   using the phyllosilicate compound as a multifunctional component being multifunctional to act as a binder and as a catalyst catalyzing the decomposition of the oxygen source.

9. The method according to claim 8, wherein the at least one transition metal ion is selected from the group consisting of iron, manganese, cobalt, zirconium, zinc, copper and titanium ions, and mixtures thereof.

10. The method according to claim 8, wherein the at least one phyllosilicate compound is phlogopite.

11. The method according to claim 8, which comprises further using the multifunctional component to act as a fuel and/or to take up reaction heat generated in an oxygen source decomposition process.

12. A method for generating oxygen, the method comprising:
   providing a composition including at least one oxygen source selected from the group consisting of alkali metal chlorates, alkali metal perchlorates, alkaline earth metal chlorates, alkaline earth metal perchlorates, and mixtures thereof;
   decomposing the composition in the container while maintaining a size and a shape thereof; and
   avoiding melting or localized melting of the composition during the decomposition by including into the composition at least one phyllosilicate compound having at least one transition metal ion intercalated between phyllosilicate sheets, the phyllosilicate compound being formed by extracting magnesium therefrom and replacing the magnesium with the transition metal ion at at least 98% of sites becoming vacancies due to the extraction of the magnesium.

13. The method according to claim 12, wherein the at least one transition metal ion is selected from the group consisting of iron, manganese, cobalt, zirconium, zinc, copper and titanium ions, and mixtures thereof.

14. The method according to claim 12, wherein the at least one phyllosilicate compound is phlogopite.

15. The method according to claim 12, which comprises reducing a temperature of the oxygen generated in the oxygen source decomposition process by adding the phyllosilicate compound.

\* \* \* \* \*